US008910425B2

(12) United States Patent
Farwell

(10) Patent No.: US 8,910,425 B2
(45) Date of Patent: Dec. 16, 2014

(54) FATIGUE RESISTANT PRESSURE RELIEF ASSEMBLY

(75) Inventor: Stephen Farwell, Owasso, OK (US)

(73) Assignee: BS&B Safety Systems, Limited, Limerick (IE)

( * ) Notice: Subject to any disclaimer, the term of this patent is extended or adjusted under 35 U.S.C. 154(b) by 677 days.

(21) Appl. No.: 10/831,494

(22) Filed: Apr. 23, 2004

(65) Prior Publication Data

US 2005/0235584 A1 Oct. 27, 2005

(51) Int. Cl.
*E04H 14/00* (2006.01)
*F16K 17/16* (2006.01)

(52) U.S. Cl.
CPC ..................................... *F16K 17/16* (2013.01)
USPC .................... 52/1; 52/98; 220/89.1

(58) Field of Classification Search
CPC .......... E04B 1/92; E04F 9/0182; E04F 9/018; E04F 2002/026; F16K 17/14; F16K 17/16; F16K 17/1606; F16K 17/1613; F16K 17/162; F16K 17/1626
USPC ........... 52/1, 200, 222, 98–100; 109/49.5, 80, 109/84; 220/89.1–89.3
See application file for complete search history.

(56) References Cited

U.S. PATENT DOCUMENTS

| | | | | |
|---|---|---|---|---|
| 3,709,169 A | * | 1/1973 | Gauger et al. | 109/29 |
| 3,864,881 A | * | 2/1975 | Wolf | 52/1 |
| 3,972,442 A | | 8/1976 | Malcolm et al. | |
| 4,176,503 A | * | 12/1979 | Ting | 52/1 |
| 4,498,261 A | * | 2/1985 | Wilson et al. | 52/1 |
| 4,662,126 A | * | 5/1987 | Malcolm | 52/167.9 |
| 4,777,974 A | * | 10/1988 | Swift et al. | 137/14 |
| 5,499,649 A | | 3/1996 | Tomasko et al. | |
| 6,607,003 B1 | | 8/2003 | Wilson | |
| 2003/0068485 A1 | * | 4/2003 | Ramsey | 428/318.4 |

* cited by examiner

*Primary Examiner* — William Gilbert
(74) *Attorney, Agent, or Firm* — Finnegan, Henderson, Farabow, Garrett and Dunner LLP

(57) ABSTRACT

A pressure relief device is provided with enhanced fatigue resistance. The pressure relief device may include, inter alia, rupture disks assemblies and explosion panel assemblies. The explosion panel assemblies include a first explosion panel, a second explosion panel, and a non-rigid buffering layer that may be selected for its thermal insulation properties. The buffering layer is interposed between the first and second explosion panels and may be configured to oppose inward flexing of these panels. The buffering layer may force surfaces of the first and second explosion panels to extend outwardly.

38 Claims, 8 Drawing Sheets

FATIGUE RESISTANT PRESSURE RELIEF ASSEMBLY

BACKGROUND OF THE INVENTION

This invention relates to pressure release devices, assemblies, and components, as well as methods of forming the same.

Many types of pressure release devices exist in the art. These pressure release devices may include, for example, explosion panels, rupture disks, vacuum breakers, tank vents, and valves. An explosion panel is one type of pressure release device that is typically used to provide an emergency pressure release under deflagration conditions in an environment such as, for example, a silo or a dust collector. An explosion panel may be subject to both a positive pressure differential or a negative pressure differential. In a positive pressure differential, the pressure within the environment is greater than the external pressure. In a negative pressure differential, the external pressure is greater than the pressure within the environment. It is typically desirable for the explosion panel to open when exposed to a predetermined positive pressure differential and to withstand a negative pressure differential, as well as normal service conditions that may produce fluctuations between both negative and positive pressure differentials.

Various methods may be used to control the predetermined positive pressure differential at which the explosion panel will open. For example, a series of slits may be cut into the explosion panel to define a series of "tabs." The slits may be cut into the opening section of the explosion panel or the flange section of the explosion panel or both. An explosion vent may be substantially flat in shape or may have a domed opening section with a flat perimeter flange area. These tabs are configured to fail in tension when the explosion panel experiences the predetermined positive activation pressure differential. The number and size of the tabs will control the pressure differential at which the explosion panel will open. Accordingly, the slits must be carefully cut to ensure that the resulting tab has the appropriate size.

One problem that has long been associated with pressure relief devices such as explosion panels is premature activation of the panels due to pressure fluctuations within the system being protected, vibrations caused by the equipment environment or structure to be protected, and other turbulences. Specifically, pressure fluctuations, vibration from the equipment, or other turbulences may cause the explosion panel to flex back and forth, resulting in fatigue stress to be transmitted along the unbroken portion of the panel, the tab, and at the ends of the slits cut into the explosion panel. This is particularly prevalent when the slits comprise elongated slots that are separated by relatively narrow tabs that flex repeatedly until the material comprising the tabs reaches its fatigue limit and breaks. As a result, the explosion panel may open at a pressure substantially below the desired burst pressure, enabling materials within the structure or the equipment to accidentally escape to the atmosphere, often without the knowledge of the operator. For example, pressure fluctuations in, and vibrations emanating from, equipment associated with hot air handling systems often cause such severe stress on the explosion panels that the panels prematurely fracture shortly after installation.

Various efforts have been made to improve the fatigue resistance of explosion panels. For example, U.S. Pat. No. 4,663,126 describes an explosion panel assembly including two explosion panels disposed in spaced, face-to-face relationship along with a core of expanded polyurethane foam interposed between the panels which purportedly functions to dampen vibrations received from the structure and transmitted to the explosion panels. The foam is introduced in an initially flowable condition into the space between the panels and thereafter expands while curing to a solidified configuration for continuously exerting pressure on both of the panels. The foam material, when cured, strengthens the assembly by providing support to the central portions of the explosion panels. As the foam cures, however, it rigidly adheres to the surfaces of the explosion panels, thereby forming a substantially solid laminated structure, which undesirably increases the strength of the explosion panels. As a result, explosion panels having a low burst pressure are more difficult to achieve. In addition, if this structure is used in a high temperature environment, and because many foams begin to degrade at a temperature of about 220° F., the foam will shrink and break down, thereby reducing the fatigue resistance of the explosion panel and impairing the sealing properties of the pressure relief device.

There is a need in the industry for an explosion panel that is capable of withstanding fatigue, and which can operate in a high temperature environment and provide low burst pressures.

SUMMARY OF THE INVENTION

Accordingly, the present invention is directed to pressure release devices, assemblies, and components that obviate one or more of the limitations and disadvantages of prior art pressure release systems. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

In accordance with one aspect, the present invention is directed to an explosion panel assembly including a first explosion panel, a second explosion panel, and a non-rigid buffering layer. The buffering layer is interposed between the first and second explosion panels. Moreover, the buffering layer is configured to oppose inward flexing of the first and second explosion panels. In one embodiment, the buffering layer forces central surfaces of the first and second explosion panels to extend outwardly in opposing directions. The first and second explosion panels may be fabricated of stainless steel, carbon steel, coated carbon steel, tin, nickel and its alloys, nickel-based super alloys, aluminum, and plastics. The buffering layer may be made of thermal insulating material such as fiberglass, mineral wool, alumino-silicate fibers, or other materials. The explosion panel assembly may further comprise a seal, where the seal is interposed between the buffering layer and the first explosion panel. Moreover, the explosion panel assembly may further comprise a cushion, where the cushion is interposed between the first explosion panel and the seal.

In accordance with another aspect, the present invention is directed to an explosion panel assembly including a substantially flat first explosion panel, a substantially flat second explosion panel, and a non-rigid buffering layer. The buffering layer is interposed between the first and second explosion panels. In addition, the buffering layer is configured to oppose inward flexing of the first and second explosion panels. In one embodiment, the buffering layer forces central surfaces of the first and second explosion layers to extend outwardly in opposing directions.

In accordance with yet another aspect, the present invention is directed to a method of manufacturing an explosion panel assembly, including providing a first explosion panel, providing a second explosion panel, and providing a non-rigid buffering layer between the first and second explosion panels. The method further includes appropriately drawing together the first explosion panel and the second explosion panel in an operative relationship, the buffering layer configured to oppose inward flexing of the first and second explosion panels. In one embodiment, the buffering layer forcing central surfaces of the first and second explosion layers to extend outwardly. In another embodiment, the first and second explosion panels are substantially flat.

In another aspect, the present invention is directed to an explosion panel assembly, comprising a first explosion panel, a second explosion panel, and a buffering layer. The buffering layer is interposed between the first and second explosion panels, but is not rigidly adhered to the first or second explosion panels and is configured to oppose inward flexing of the first and second explosion panels. The explosion panel assembly buffering layer may also force central surfaces of the first and second explosion panels to extend outwardly.

In yet another aspect, the present invention is directed to an explosion panel assembly, comprising a first explosion panel, a second explosion panel, and a buffering layer comprising a plurality of components. The components are not physically connected to each other, although they may be in at least a touching relationship. The buffering layer is interposed between the first and second explosion panels. Moreover, the buffering layer is configured to oppose inward flexing of the first and second explosion panels. The buffering layer may also be configured to force central surfaces of the first and second explosion panels to extend outwardly. In one embodiment, the buffering layer components are rigid. In another embodiment, the buffering layer components are non-rigid.

In still yet another aspect, the present invention is directed to a pressure relief assembly, comprising a first pressure relief member, a second pressure relief member, and a non-rigid buffering layer. The buffering layer is interposed between the first and second pressure relief members and the buffering layer is configured to oppose inward flexing of the first and second members. The buffering layer may also be configured to force central surfaces of the first and second members to extend outwardly.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

The present invention is directed to fatigue resistant pressure relief devices that may also be especially suitable for high temperature applications. Many types of pressure release devices exist in the art. These pressure release devices may include, for example, explosion panels, rupture disks, vacuum breakers, tank vents, and valves. The pressure relief device may be an explosion panel assembly and include two explosion panels and a buffering layer disposed between the explosion panels. The pressure relief device may also include one or more gaskets, seals, or cushions.

Figure 1:
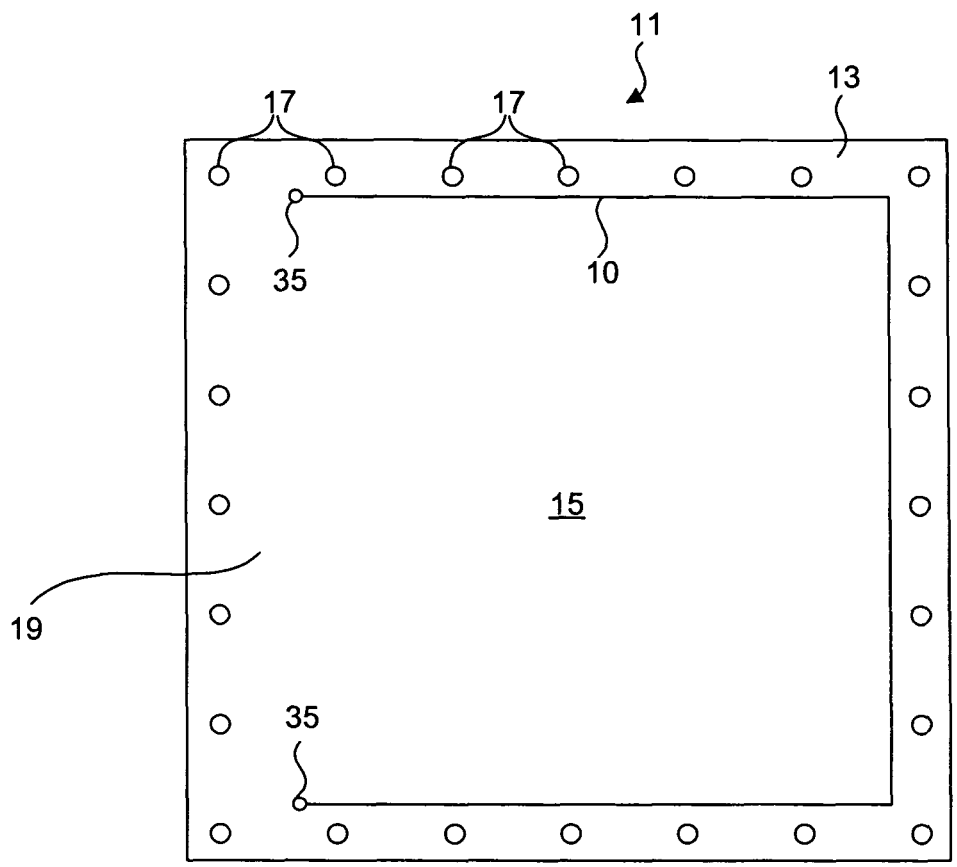
FIG. 1 is a top plan view of an explosion panel in accordance with an embodiment of the present invention.

An exemplary explosion panel is illustrated in FIG. 1 and is designated generally by reference number 11. As shown, the explosion panel 11 may include a flange section 13 and a central section 15 that prescribes the opening part of the explosion panel. In one embodiment, the explosion panel 11 may be substantially flat. In another embodiment, the explosion panel 11 may include a slight bulge in the central surface of the explosion panel.

The flange section 13 defines the shape of the explosion panel. The flange section 13 may have a square shape as illustrated in the exemplary embodiment of FIG. 1. Alternatively, the flange section 13 may be any other shape used in an explosion panel, such as, for example, rectangular, triangular, trapezoidal, or circular. The shape of the explosion panel may be readily selected by a skilled artisan based on the structure desired to be protected by the explosion panel assembly.

The flange section 13 may include a plurality of openings 17. The openings 17 may be spaced around the flange section 13. Each opening 17 may be configured to receive a fastener, such as, for example, a bolt. A plurality of fasteners may be disposed in the openings 17 to secure the explosion panel 11 to a structure, such as, for example, a frame.

The explosion panel 11 may be secured to a structure so that central section 15 is exposed to an enclosed environment that may potentially experience an increased pressure condition. For example, the explosion panel 11 may be engaged with a silo, a dust collector, or incinerator waste gas recycling unit. The explosion panel 11 may be configured such that the central section 15 will open to create a vent path when the pressure within the enclosed environment exceeds the external pressure by a predetermined limit. When two explosion panels are included in an explosion panel assembly, one explosion panel, i.e., the outer panel, will be exposed to the outside atmosphere, while the other explosion panel, i.e., the inner panel, is exposed to the enclosed environment.

As shown in FIG. 1, a line of weakness 10 may be disposed on the explosion panel 11. Lines of weakness are provided on an explosion panel to provide the desired burst pressure of the panel, as well as to control the rupture pattern of the surface of the explosion panel. The line of weakness 10 may extend along a portion of the perimeter of the explosion panel 11 and terminate in two end points 35. This is commonly referred to as a perimeter fail arrangement. The line of weakness 10 may provide a separation between the central section 15 and the flange section 13. In addition, the line of weakness 10 may define an unweakened hinge section 19 between the central section 15 and the flange section 13.

The line of weakness 10 may be, for example, a slit or a score line. The line of weakness 10 is configured such that the explosion panel 11 will open, or tear in the case of a score line, along the line of weakness 10 when the explosion panel 11 is exposed to a predetermined pressure differential. For example, when a score line is provided as the line of weakness 10, the location, width, and depth of the score line may be altered to change the predetermined pressure differential at which the explosion panel 11 will open. In the case of a slit, the line of weakness 10 may be intermittent. The spacing of the slit interval may also be altered to control the predetermined differential pressure at which the explosion panel will open. It should also be noted that the line of weakness 10 may be near to or in the flange section 13 of the explosion panel 11, or the line of weakness 10 may be disposed between the flange section 13 and the central section 15.

Figure 2:
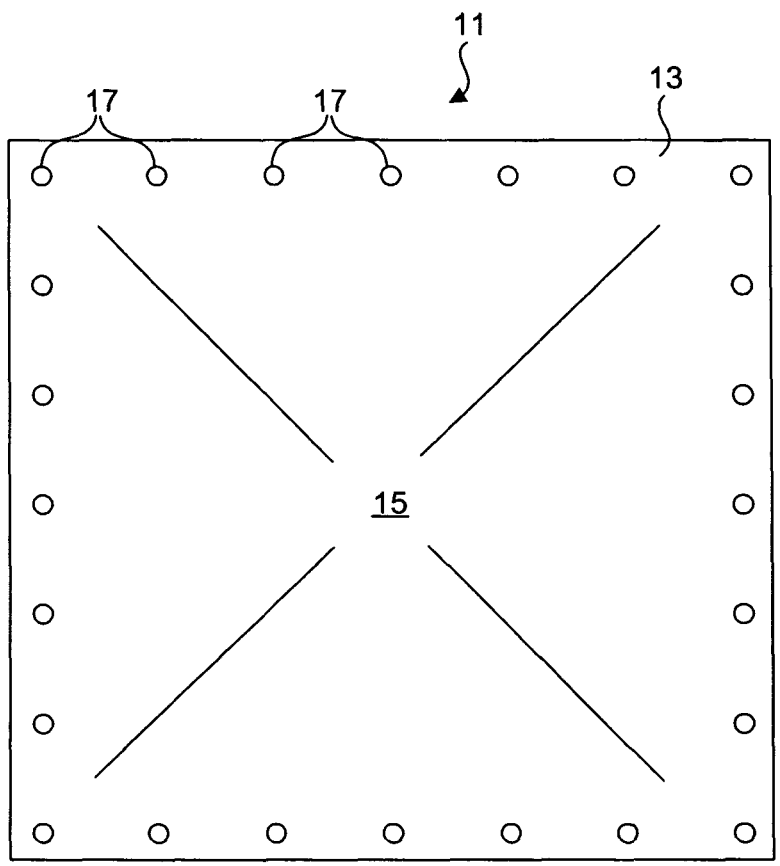
FIG. 2 is a top plan view of an explosion panel in accordance with another embodiment of the present invention.

Multiple lines of weakness 10 may be included in the explosion panel 11. As shown in FIG. 2, multiple lines of weakness 10 may be included in the central section that are angularly disposed to the flange sections 13. This is commonly referred to as a center fail arrangement. Those of ordinary skill in the art will understand that varying lines of weakness arrangements may be included in the explosion panels based, at least in part, on the desired burst pressure of the panel. Additionally, the explosion panel may include stress distribution features, such as those set forth in U.S. patent application Ser. No. 10/035,229, which is incorporated herein in its entirety by reference.

Other factors that at least in part determine the burst pressure of an explosion panel include the type of material used, the thickness of the material, the surface area of the explosion panel, and the temperature of the operating environment. Those of ordinary skill in the art will be able to readily fabricate an explosion panel having the desired burst pressure based on at least the above factors.

The explosion panel 11 may be fabricated of any material commonly used in explosion panels, including, but not limited to, stainless steel, carbon steel, coated carbon steel, tin, nickel and its alloys, nickel-based super alloys, aluminum, and plastics. The material selection may be based on a variety of factors including, but not limited to, corrosion and abrasion resistance, desired burst pressures, environmental conditions, such as temperature, and cost. When more than one explosion panel is provided in an assembly, it is not necessary that the explosion panels be fabricated of the same materials. Explosion panels of the present invention may be used in temperatures of up to at least 1000° F. or higher according to the capabilities of the materials selected. Additionally, explosion panels of the present invention may, in some embodiments, have burst pressures in the range of from about 0.1 p.s.i. to about 10 p.s.i. However, in other embodiments, explosion panels of the present invention may have burst pressures greater than 10 p.s.i.

The explosion panel 11 may have any thickness capable of achieving the desired burst pressure. In one embodiment, the explosion panel has a thickness of 0.005". In another embodiment, the explosion panel 11 is fabricated of 316 stainless steel and has a thickness of 0.015". The thickness of the explosion panel in some embodiments may be less than 0.005" and, in other embodiments, may be substantially grater than 0.015". The thickness of the explosion panel 11 may be determined based on the surface area of the explosion panel, the properties of the material of construction, the desired burst pressure, as well as other factors. The dimensions and, hence, the surface area of the explosion panel will depend, at least in part, on the size of the system being protected by the explosion panel. In one embodiment, the explosion panel is 36"×36". In another embodiment, the explosion panel is circular and has a diameter of 40". However, explosion panels 11 can be fabricated of any dimensions that are appropriate for the system being protected. Those of ordinary skill in the art will understand that the selection of materials, as well as the physical dimensions, of the explosion panel are based on a number of factors, including desired burst pressure, space limitations, size of area to be vented, and environmental operating conditions including corrosion resistance.

Figure 3:
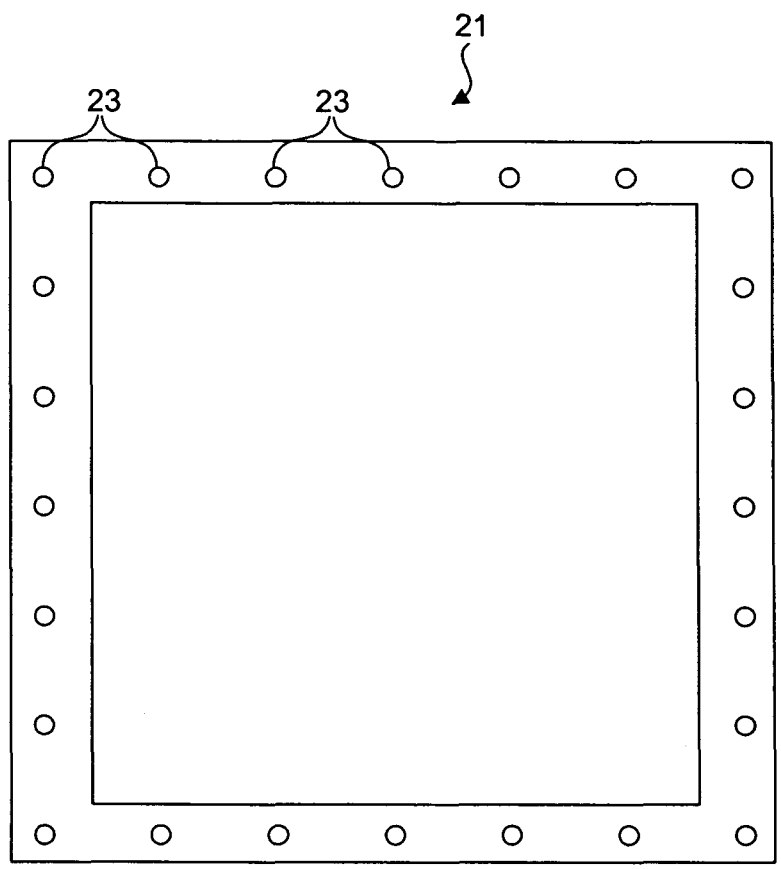
FIG. 3 is a top plan view of a gasket in accordance with an embodiment of the present invention.

As shown in FIG. 3, the explosion panel assembly may also include a gasket 21 engaged with the explosion panel 11. The gasket 21 may be made of a rubber or silicone based material, or any other material that will prevent leakage of fluids to the atmosphere. Often, in high temperature environments, high temperature fiberglass, ceramics, or other materials are used. The gasket is typically engaged to the explosion panel 11 with an adhesive material for shipping and handling purposes, and when the explosion panel assembly is installed the gasket prevents fluids from escaping through the flange section 13 when it is attached to a duct (not shown) or other structure supporting the explosion panel assembly. The gasket 21 may be disposed on either surface of the explosion panel 11. In addition, it is contemplated that two or more gaskets 21 may be used in order to seal each surface of the explosion panel assembly.

Figure 4:
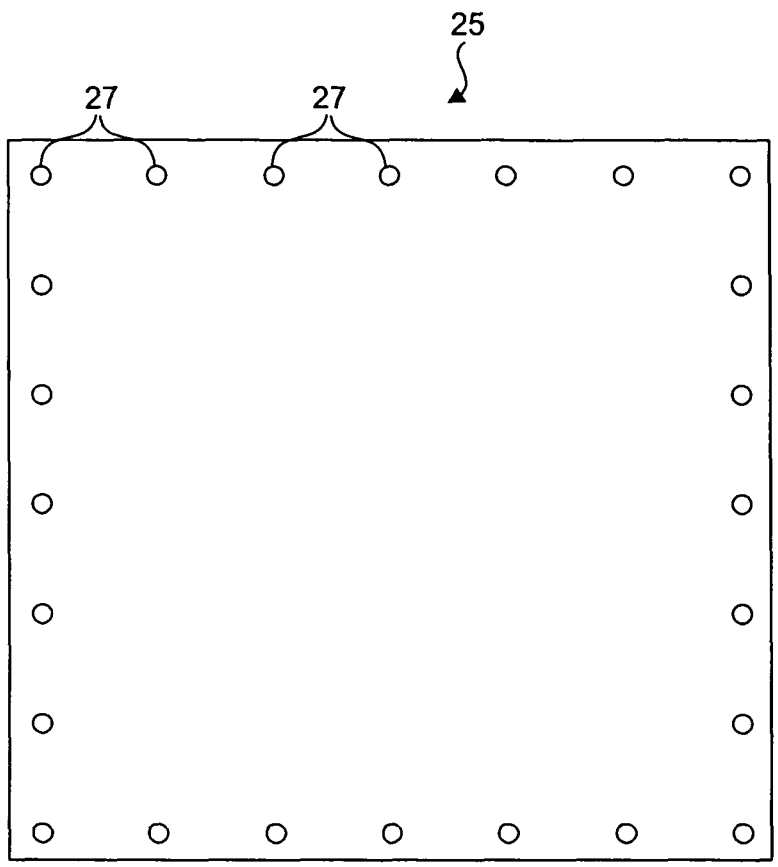
FIG. 4 is a top plan view of a seal in accordance with an embodiment of the present invention.

FIG. 4 depicts a fluid barrier seal. The seal 25 may be located on the non-discharge side of the explosion panel 11. When two explosion panels are provided in an assembly, the seal may be provided on the non-discharge side of the outer panel, i.e., the panel that is typically exposed to the atmosphere. For example, in one embodiment, the seal 25 may be located adjacent to the outer explosion panel. In another embodiment, however, the seal 25 may be located adjacent to the inner explosion panel. The seal 25 may be a solid sheet of material and should not include lines of weakness. In another embodiment, however, the seal may be applied only to the lines of weakness of the explosion panel. The seal 25 should have a burst pressure that is no greater than that of the explosion panel 11. The seal 25 material should be substantially impervious to fluids and, thus, prevent fluids from escaping to the atmosphere prior to bursting of the explosion panel 11. The seal 25 may be fabricated of any material that will provide an appropriate bursting pressure and that will not chemically deteriorate from contact with the process being protected. Such materials include Teflon, aluminum, polyethylene, rubber, silicone adhesives, or any other material that will prevent the fluids from escaping to the atmosphere.

As shown in FIG. 4, the seal 25 may include a plurality of openings 27. The openings 27 may be spaced around the periphery of the seal 25. Each opening 27 may be configured to receive a fastener, such as, for example, a bolt. A plurality of fasteners may be disposed in the openings 27 to secure the seal 25 to a structure, such as, for example, a frame. The openings 27 should be configured to correspond with the explosion panel flange openings 17.

Figure 5:
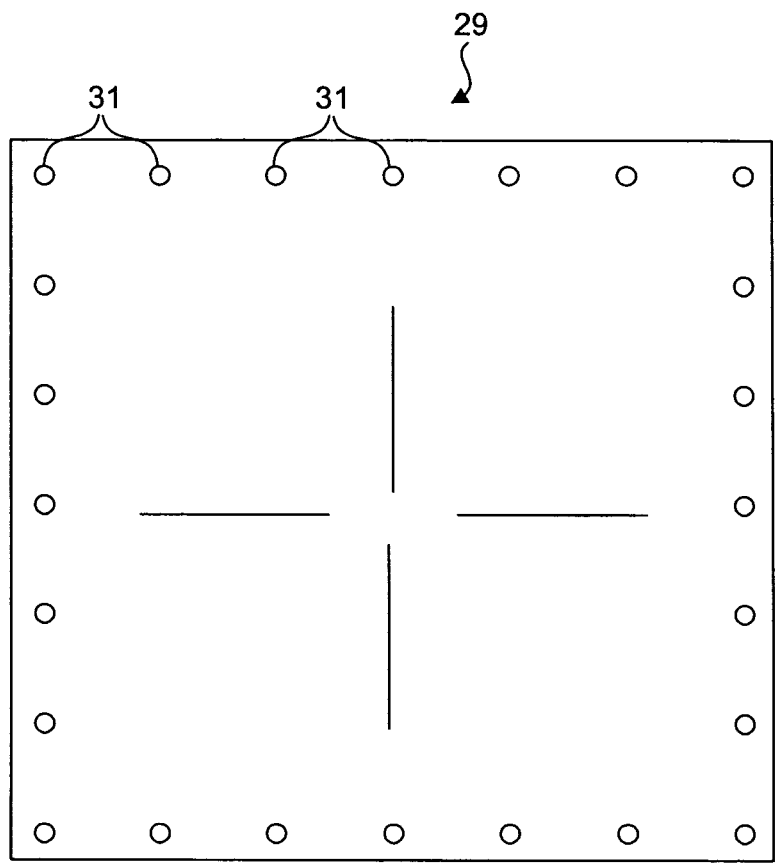
FIG. 5 is a top plan view of a cushion in accordance with an embodiment of the present invention.

As shown in FIG. 5, the explosion panel assembly may include a cushion. When included, the cushion 29 is interposed between the explosion panel and the seal 25. The cushion is provided to protect the seal 25 from being cut, punctured, or otherwise deteriorated, by sharp edges that may exist on the explosion panel 11. The cushion 29 may include lines of weakness 10 similar to those of the explosion panel 11. The cushion 29 has a burst pressure that is less than that of the explosion panel 11. The cushion 29 may be fabricated from any material that will provide an appropriate bursting pressure, that will not chemically deteriorate from contact with the process being protected, and that will provide adequate protection to the seal.

As shown in FIG. 5, the cushion 29 may include a plurality of openings 31. The openings 31 may be spaced around the periphery of the cushion 29. Each opening 31 may be configured to receive a fastener, such as, for example, a bolt. A plurality of fasteners may be disposed in the openings 31 to secure the cushion 29 to a structure, such as, for example, a frame. The openings 31 should be configured to correspond with the explosion panel flange openings 17.

Figure 6:
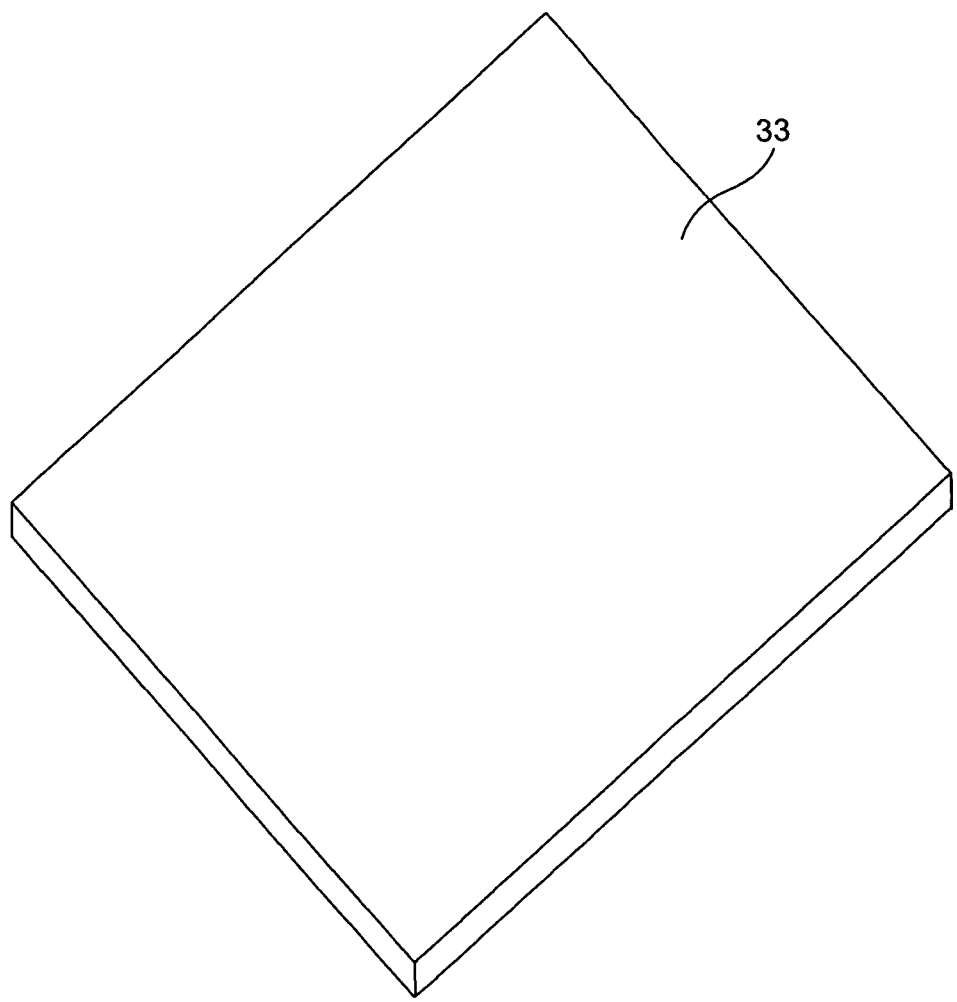
FIG. 6 is a perspective view of a buffering layer in accordance with an embodiment of the present invention.

As depicted in FIG. 6, the explosion panel assembly may also include a buffering layer. The buffering layer 33 may be interposed between two explosion panels 11. When the buffering layer 33 is included between two facing, substantially flat, or bulged, explosion panels 11, the buffering layer 33 is configured to oppose inward flexing of the first and second explosion panels. The phrase "oppose inward flexing" is intended to mean that the inward flexing of the explosion panel is at least reduced, not necessarily eliminated. In one embodiment, the buffering layer causes the central surfaces of the original substantially flat panels 11 to extend outwardly, thereby providing tension to the panels 11 in opposing directions. The tension provided by the buffering layer 33 limits the movement of the explosion panels 11 to a minimum, thereby reducing fatigue stresses and enhancing the longevity of the explosion panel assembly. In addition, the restriction of movement of the explosion panels 11 also reduces damage that may be inflicted upon the buffering layer 33 by the panels due to pressure fluctuations, vibrations, or other turbulence. Sufficient buffering material may be provided to substantially prevent the surfaces of the explosion panels from flexing. One of ordinary skill in the art will be able to readily determine the amount of buffering material required. In one embodiment of the present invention, the buffering layer 33 also functions as a cushion. Conversely, in another embodiment, the cushion also functions as a buffering layer. Moreover, in some embodiments, the buffering layer 33 may have thermal insulating properties.

In another embodiment of the present invention, the explosion panel assembly may include an explosion panel 11 and a support panel. The support panel may be made of one or more elements sufficient to provide support for the buffering layer 33. In this embodiment, the buffering layer may be interposed between the support panel and the explosion panel 11, the buffering layer 33 configured to oppose inward flexing of the explosion panel 11. In one embodiment, the buffering layer causes the central surface of the explosion panel 11 to expand outwardly, thereby providing tension to the panel 11 in the outward direction.

The buffering layer 33 can be made of any material that will provide the necessary bulk to provide the appropriate tension in the explosion panels 11, and that may or may not rigidly adhere to the explosion panels 11. For example, in one embodiment, the non-rigid buffering layer 33 may have a adhesive strip for securing the buffering layer 33 to at least one of the explosion panels 11. In another embodiment, the buffering layer is a plurality of components that are not physically connected to each other, although they may be in a touching relationship. The plurality of components may be rigid or non-rigid. Appropriate non-rigid materials include, but are not limited to, fiberglass, mineral wool, alumino-silicate fibers, other synthetic fibers, urethane foam, ceramic sheet, or foam, as well as other materials that provide the desired tensioning of the first and second explosion panels. Materials that are considered rigid, and not appropriate for use in a non-rigid buffering layer, include initially flowable, synthetic resin material that self-expands while curing to a solidified condition, and other materials having similar properties.

In high temperature environments, materials should be selected that will not degrade when exposed to temperatures of greater than at least 200° F., and in some environments should have even higher temperature degradation tolerances. In such high temperature environments, the buffering layer 33 may have thermal insulating properties. In low temperature environments, materials that will degrade at temperatures of 200° F., or less, may be used. In one embodiment of the present invention, the material is in sheet form, such as a blanket. In another embodiment, the material is in loose pack form. Any form of the material may be used that will allow the buffering layer to be interposed between the explosion panels. One, or more than one, layer of buffering layer can be used in an explosion panel assembly. In addition, layers of multiple types of materials may be used. Moreover, when multiple buffering layers 33 are used, it is not necessary that the buffering layers 33 be of the same physical dimensions or compositions. One material that has been successfully employed is Fiberfrax Durablanket®, available from Unifrax Corp. of Niagara Falls, N.Y. Fiberfrax Durablanket® is a blanket fabricated of alumino-silicate fibers, which exhibits high temperature stability for continuous use at temperatures up to 1430° F.

Figure 7:
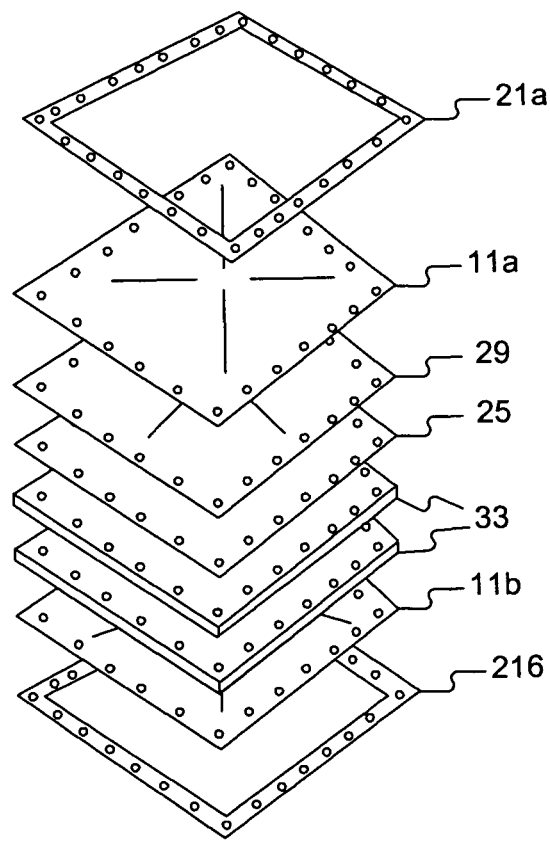
FIG. 7 is an exploded view of an explosion panel assembly in accordance with an embodiment of the present invention.

An exemplary explosion panel assembly is depicted in FIG. 7. As shown in FIG. 7, the explosion panel assembly in this embodiment is rectangular in shape. The layers of the explosion panel assembly are depicted in FIG. 7. In this embodiment, the top and bottom layers of the assembly are gaskets 21. The outermost gasket 21a is in communication with the outer explosion panel 11a, which, when installed in a structure, is in communication with the atmosphere, while the inner gasket 21b is in communication with the inner explosion panel 11b. A seal 25 is located underneath the outer explosion panel 11a, with a cushion 29 interposed between the seal 25 and the outer explosion panel 11a. Two layers of buffering layer 33 are interposed between the seal 25 and the inner explosion panel 11b. In this embodiment, the two buffering layers are blanket-type insulation. When the flange sections 13 of the outer and inner explosion panels are appropriately drawn together in an operative relationship, the buffering layers will force the surfaces of the outer and inner expansion panels to extend outwardly in opposing directions, such that the surfaces of the panels are in tension.

As shown in FIG. 7, the outer explosion panel 11a has lines of weakness 10 angularly disposed to the flange section 13. The lines of weakness could, however, be located along the perimeter of the explosion panel, or could be located in any arrangement that will provide the desired burst pressure. The inner explosion panel 11b can have a line of weakness pattern that is identical to that of the outer explosion panel, or it may have lines of weakness located in another arrangement. A skilled artisan will be able to readily determine the line of weakness arrangements for the outer and inner explosion panels based on a variety of factors, including, but not limited to, burst pressure.

While the exemplary configuration set forth in FIG. 7 has two layers of buffering layer 33, the explosion panel assembly could have one or more than two layers of buffering layer 33. One of ordinary skill in the art will be able to determine the appropriate number of layers of buffering layer to provide the necessary amount of tension on the surfaces of the outer and inner explosion panels.

Figure 8:
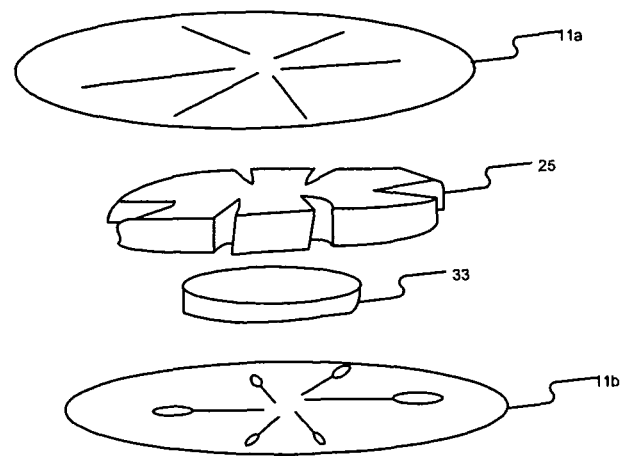
FIG. 8 is an exploded view of an explosion panel assembly in accordance with another embodiment of the present invention.

Another embodiment of the present invention is depicted in FIG. 8. In this embodiment, the explosion panels 11 are circular. The assembly includes an outer explosion panel 11*a* and a inner explosion panel 11*b*. Interposed between the outer and inner explosion panels are a seal 25 and a single buffering layer 33, the seal being in communication with and adjacent to the outer explosion panel 11*b*. As noted above, more than one buffering layer may be used in the assembly, if desired. Moreover, the explosion panel assembly may also include gaskets and a cushion. While a cushion is not required, leakage through the seal may occur if the seal is punctured, torn, or otherwise deteriorated by sharp edges on the outer explosion panel.

It will be apparent to those skilled in the art that various modifications and variations can be made in the aforementioned embodiments without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An explosion panel assembly, comprising:
   a first explosion panel;
   a second explosion panel; and
   a buffering layer interposed between the first and second explosion panels without rigidly adhering to either of the first and second explosion panels;
   wherein the buffering layer is configured to oppose inward flexing of the first and second explosion panels;
   wherein at least one of the explosion panels includes a line of weakness for at least partially controlling a predetermined pressure differential at which the at least one explosion panel opens; and
   wherein a slidable relationship exists between the buffering layer and the first explosion panel and the second explosion panel during the opening of the explosion panel assembly.

2. The explosion panel assembly according to claim 1, wherein the first and second explosion panels are made of material selected from the group consisting of stainless steel, carbon steel, coated carbon steel, nickel and its alloys, nickel-based super alloys, aluminum, tin, carbon or carbon composite, and plastics.

3. The explosion panel assembly according to claim 1, wherein the buffering layer is selected from the group consisting of fiberglass, mineral wool, and alumino-silicate fibers.

4. The explosion panel assembly according to claim 1, wherein the buffering layer has thermal insulating properties.

5. The explosion panel assembly according to claim 1 further comprising a seal.

6. The explosion panel assembly according to claim 5, wherein the seal is interposed between the buffering layer and the first explosion panel.

7. The explosion panel assembly according to claim 5 further comprising a cushion, wherein the cushion is interposed between the first explosion panel and the seal.

8. The assembly of claim 1, wherein at least one of the explosion panels includes a line or weakness configured in a perimeter fail arrangement.

9. The assembly of claim 1, wherein at least one of the explosion panels includes a line or weakness configured in a center fail arrangement.

10. The assembly of claim 1, wherein the explosion panels have a substantially circular shape.

11. An explosion panel assembly, comprising:
    a first explosion panel;
    a second explosion panel;
    a buffering layer,
    wherein the buffering layer is non-adheringly interposed between the first and second explosion panels and wherein the buffering layer forces central surfaces of the first and second explosion panels to extend outwardly;
    wherein at least one of the explosion panels includes a line of weakness for at least partially controlling a predetermined pressure differential at which the at least one explosion panel opens; and
    wherein the buffering layer is configured to slide relative to the first explosion panel and second explosion panel when the explosion panel assembly opens.

12. The explosion panel assembly according to claim 11, wherein the first and second explosion panels are made of material selected from the group consisting of stainless steel, carbon steel, nickel and its alloys, nickel-based super alloys, aluminum, tin, and plastics.

13. The explosion panel assembly according to claim 11, wherein the buffering layer is selected from the group consisting of fiberglass, mineral wool, and alumino-silicate fibers.

14. The explosion panel assembly according to claim 11, wherein the buffering layer has thermal insulating properties.

15. The explosion panel assembly according to claim 11 further comprising a seal.

16. The explosion panel assembly according to claim 15, wherein the seal is interposed between the buffering layer and the first explosion panel.

17. The explosion panel assembly according to claim 15, further comprising a cushion, wherein the cushion is interposed between the first explosion panel and the seal.

18. A method of manufacturing an explosion panel assembly comprising:
    providing a first explosion panel;
    providing a second explosion panel;
    interposing a fully cured buffering layer between the first and second explosion panels, wherein the buffering layer is configured to oppose inward flexing of the first and second explosion panels;
    configuring the fully cured buffering layer to slide relative to the first and second explosion panels during the opening of the explosion panel assembly; and
    providing a line of weakness in at least one of the first and second explosion panels for at least partially controlling a predetermined pressure differential at which the at least one explosion panel opens.

19. The method according to claim 18 wherein the buffering layer forces the central surfaces of the first and second explosion panels to extend outwardly.

20. The method according to claim 18, wherein the first and second explosion panels are made of material selected from the group consisting of stainless steel, carbon steel, nickel and its alloys, nickel-based super alloys, aluminum, tin, and plastics.

21. The method according to claim 18, wherein the buffering layer is selected from the group consisting of fiberglass, mineral wool, and alumino-silicate Fibers.

22. The method according to claim 18, wherein the buffering layer has insulating properties.

23. The method according to claim 18, wherein a seal is interposed between the buffering layer and the first explosion panel.

24. The method according to claim 23 further comprising interposing a cushion between the first explosion panel and the seal.

25. A method of manufacturing an explosion panel assembly, comprising:
providing a substantially flat first explosion panel;
providing a substantially flat second explosion panel;
providing a buffering sheet between the first and second explosion panels;
securing the first explosion panel with the second explosion panel, the buffering sheet configured to oppose inward flexing of the first and second explosion panels;
configuring the buffering sheet to slide relative to the first and second explosion panels when the explosion panel assembly opens; and
providing a line of weakness in at least one of the first and second explosion panels for at least partially controlling a predetermined pressure differential at which the at least one explosion panel opens.

26. The method according to claim 25, wherein the buffering sheet is configured to force central surfaces of the first and second explosion panels to extend outwardly.

27. An explosion panel assembly, comprising:
an initially closed first explosion panel configured to open when exposed to a predetermined pressure differential;
an initially closed second explosion panel configured to open when exposed to a predetermined pressure differential;
a buffering layer having a periphery, the periphery defining at least one hole,
wherein the buffering layer is interposed between the first and second explosion panels by way of a fastener extending through the at least one hole, and wherein the buffering layer is configured to oppose inward flexing of the first and second explosion panels;
wherein a slidable relationship exists between the buffering layer and the first explosion panel and the second explosion panel during the opening of the explosion panel assembly; and
wherein a line of weakness is provided in at least one of the first and second explosion panels for at least partially controlling a predetermined pressure differential at which the at least one explosion panel opens.

28. The explosion panel assembly according to claim 27, wherein the buffering layer is configured to force central surfaces of the first and second explosion panels to extend outwardly.

29. An explosion panel assembly, comprising:
a first explosion panel;
a second explosion panel;
a buffering layer comprising a plurality of loose-packed components, the components not physically attached to each other or the explosion panels,
wherein the buffering layer is interposed between the first and second explosion panels, and wherein the buffering layer is configured to oppose inward flexing of the first and second explosion panels; and
wherein at least one of the explosion panels includes a line of weakness for at least partially controlling a predetermined pressure differential at which the at least one explosion panel opens.

30. The explosion panel assembly according to claim 29, wherein the buffering layer is configured to force central surfaces of the first and second explosion panels to extend outwardly.

31. The explosion panel assembly according to claim 29, wherein the buffering layer components are rigid.

32. The explosion panel assembly according to claim 29, wherein the buffering layer components are non-rigid.

33. A pressure relief assembly, comprising:
a first pressure relief member;
a second pressure relief member;
a buffering layer,
wherein the buffering layer is not rigidly attached to either of the first and second pressure relief members, wherein the buffering layer is configured to slide relative to the first and second pressure relief members upon opening of the first and second pressure relief members, and wherein the buffering layer is configured to oppose inward flexing of the first and second pressure relief members; and
wherein at least one of the pressure relief members includes a line of weakness for at least partially controlling a predetermined pressure differential at which the at least one pressure relief member opens.

34. The pressure relief assembly according to claim 33, wherein the buffering layer is configured to force central surfaces of the first and second pressure relief members to extend outwardly.

35. A pressure relief assembly, comprising:
at least a first pressure relief member;
a buffering layer,
wherein the buffering layer engages non-sealingly with the at least a first pressure relief member,
wherein the buffering layer is configured to oppose inward flexing of the at least a first pressure relief member;
wherein the buffering layer is configured to slide relative to the at least a first pressure relief member when the at least a first pressure relief member opens; and
wherein the pressure relief member includes a line of weakness for at least partially controlling a predetermined pressure differential at which the pressure relief member opens.

36. The pressure relief assembly according to claim 35, wherein the buffering layer is configured to force a central surface of the at least first pressure relief member to extend outwardly.

37. The pressure relief assembly according to claim 35, wherein the pressure relief member is an explosion panel.

38. A pressure relief assembly, comprising:
at least a first pressure relief member;
a loose-packed buffering layer,
wherein the buffering layer is not adhered to the pressure relief member, and wherein the buffering layer is configured to oppose inward flexing of the pressure relief member; and
wherein the pressure relief member includes a line of weakness for at least partially controlling a predetermined pressure differential at which the pressure relief member opens.

* * * * *